(12) United States Patent
Dasari et al.

(10) Patent No.: US 9,930,357 B2
(45) Date of Patent: Mar. 27, 2018

(54) SYSTEMS AND METHODS FOR MOTION ESTIMATION FOR CODING A VIDEO SEQUENCE

(71) Applicant: Uurmi Systems Private Limited, Hyderabad (IN)

(72) Inventors: Mallesham Dasari, Telangana (IN); Himanshu Sindwal, Telangana (IN); Naresh Vattikuti, Telangana (IN); Srinivasa Rao Venkata Maddela, Telangana (IN)

(73) Assignee: Uurmi Systems PVT. LTD., Telangana (IN)

( * ) Notice: Subject to any disclaimer, the term of this patent is extended or adjusted under 35 U.S.C. 154(b) by 172 days.

(21) Appl. No.: 15/059,982

(22) Filed: Mar. 3, 2016

(65) Prior Publication Data

US 2017/0257641 A1    Sep. 7, 2017

(51) Int. Cl.
*H04N 7/12* (2006.01)
*H04N 15/00* (2006.01)
*H04N 19/513* (2014.01)
*H04N 19/56* (2014.01)
*H04N 19/53* (2014.01)
*H04N 19/577* (2014.01)

(52) U.S. Cl.
CPC .......... *H04N 19/513* (2014.11); *H04N 19/53* (2014.11); *H04N 19/56* (2014.11); *H04N 19/577* (2014.11)

(58) Field of Classification Search
CPC .... H04N 19/577; H04N 19/513; H04N 19/56; H04N 19/53
See application file for complete search history.

(56) References Cited

U.S. PATENT DOCUMENTS

| | | | |
|---|---|---|---|
| 2007/0237232 A1* | 10/2007 | Chang | H04N 19/51 375/240.16 |
| 2011/0170611 A1* | 7/2011 | Lai | H04N 19/51 375/240.24 |
| 2013/0170552 A1* | 7/2013 | Kim | H04N 19/597 375/240.16 |
| 2013/0301727 A1* | 11/2013 | Huang | H04N 19/00587 375/240.16 |
| 2017/0280150 A1* | 9/2017 | Sugio | H04N 19/96 |
| 2017/0289570 A1* | 10/2017 | Zhou | H04N 19/52 |

* cited by examiner

*Primary Examiner* — Tsion B Owens
(74) *Attorney, Agent, or Firm* — Next IP Law Group (57) ABSTRACT

Systems and methods for motion estimation for video encoding are described. The method observes the motion from the previous frames of the video uses the same for predicting search pattern and classifying the motion for the current frame. The motion in the video is predicted by calculating the Temporal Redundancy Achieved for previous frames and the Block Movement Factor in the previous frame. The method also considers the available bandwidth for choosing the search pattern especially, in the case of video streaming in wireless mobile ad hoc networks.

14 Claims, 5 Drawing Sheets

SYSTEMS AND METHODS FOR MOTION ESTIMATION FOR CODING A VIDEO SEQUENCE

FIELD OF THE DISCLOSURE

The present disclosure is generally related to the field of video compression, and more particularly to motion estimation for video coding.

BACKGROUND

A video stream comprises of a plurality of frames/images that comprise a substantial amount of data. To increase the efficiency of a video system, a video that needs to be transmitted or stored is digitally compressed by removing redundancies from images. Digital compression reduces the number of bits needed to represent the video while maintaining quality of the video. The reduction in bits allows more efficient use of channel bandwidth and reduces storage requirements. In a video stream there may exist certain blocks of pixels that are temporarily redundant. To take advantage of temporal redundancy in the video, "motion compensation" technique is utilized. Motion compensation technique is often employed in connection with digital compression of a video stream. The basic idea of motion estimation is to look for a block of pixels in a current frame that is same or nearly the same as portions of previous frames, although in different positions because the subject of the frame has moved. If such a block of similar pixels is found, then the system only needs to transmit a code that tells the reconstruction end of the system where to find the needed pixels in a previously received frame. Thus motion estimation is the task of finding predictive blocks of image pixels within reference frames that best match a similar-sized block of pixels in the current frame.

The displacement between the currently-coded block and the best matching block in the previous frame is indicated by a "motion vector", which is the result produced by the motion estimation process. The motion vector is transmitted along with the transformed, quantized, reordered, entropy-encoded difference information for the current block. The motion compensation allows for a minimization of the differences between the current pixel block and the reference block, so that the amount of data required to be transmitted/recorded can be minimized. Motion compensation is a key component of video coding technologies, and is one of the most computationally complex processes within a video encoding system. An issue that arises with motion-compensated video compression-coding is the amount of processing required for the coding. Motion estimation may comprise a significant part of the processing burden, particularly when a so-called "full search" algorithm is employed.

The enormous technological enhancements for accessing video content through smart phones, tabs and mobiles phones from the past few decades drove many of the video coding standards to produce good quality stream with low bitrates. The high compression performance may be achieved by using video coding standards such as High Efficiency Video Coding (HEVC), H.264/MPEG-AVC and MPEG4 where temporal redundancy that can be notably reduced using inter frame prediction. The inter frame prediction is done by using a block matching algorithm, which performs the motion estimation of macro blocks between the frames. Specifically, HEVC is said to double the data compression ratio compared to H.264/MPEG-4 at the same level of video quality. It can alternatively be used to provide substantially improved video quality at the same bit rate. HEVC replaces 16×16 pixel macro blocks which were used with previous standards with coding tree units (CTUs) which can use larger block structures of up to 64×64 samples and can better sub-partition the picture into variable sized structures. This, however, has led to the dramatic increase in computational complexity, as an instance, HEVC standard supports very high resolution videos up to 4K (3840×2160 pixels) and 8K (7680×4320 pixels) dividing each image into coding tree units and each coding tree units into 4×4 to 64×64 block pixels. The Coding Tree Unit (CTU) or coding block based search algorithm used for motion estimation in HEVC achieves higher compression performance than existing video coding standards such as H.264/AVC, MPEG-series, but with huge computational complexity.

A number of methods for reducing the complexity have been provided till now, however, each method has its drawbacks. In one method, the search is chosen by predicting the movements of the same objects by constructing depth maps at some constant regular intervals. However, the method does not concentrate on varying the search patterns based on the created depth maps on a frame level or block level. In another method, adaptive search patterns are utilized that are based on the motion content in the video using Error Descent Rate (EDR) calculation. This method however, does not concentrate on the motion present in the video or scene cut details or previous error residual of the frames. Also, this is not fit for the video flows which have variable bandwidth at each link in a wireless network. In another method, the efficient content based algorithm is proposed using temporal redundancy (TRA) approach by choosing the search pattern dynamically with optimized adaptive search range. In all of these algorithms, the search range or search patterns are selected adaptively based on the motion content without having the knowledge of the network which receives the encoded bit stream.

In most of the real time video streaming applications, it is impossible to know the motion present in the video before the video flow is started. Hence most of the existing motion estimation algorithms have fixed search pattern selected at the starting of the flow. This, however, can lead to improper selection of search algorithm in the case of video flows across a wireless networks with dynamic bandwidth capability, though there is a provision for estimating available bandwidth for a link at each node in the network. Moreover, the calculation to be performed in techniques such as ITU-T H.264/ISO MPEG-4 AVC based encoder, increases manifolds considering that motion estimation may need to be performed using multiple references or block sizes. It is therefore highly desirable to consider fast motion estimation strategies so as to reduce encoding complexity while simultaneously having minimal impact on compression efficiency and quality. Further, the non deterministic bandwidth allocation in wireless mobile ad hoc networks will have huge impact in video flows using such coding standards.

Hence, there exists a need for a method for dynamically selecting an efficient block matching algorithm based on video content and the available bandwidth. There is also a need for a method for detecting the variance of motion in the video based on the temporal redundancy achieved for reducing the number of candidate macro blocks that need to be searched in the reference frames. Moreover, there is a need to optimize the motion estimation in video coding at the application level balancing the Quality of Service at the network layer in video flows over wireless networks.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a system and an associated method for coding a video sequence is described. The system comprises of at least a memory and a processor. The memory is configured for storing one or more data, one or more metadata and one or more programming modules, and the like. The processor is configured for executing the one or more programming modules stored in the memory. The processor upon execution of the programming modules extracts one or more macro blocks from each of the plurality of frames. Thereafter, a motion vector is determined for each of the one or more macro blocks by dynamically performing motion estimation, then, a candidate macro block is determined for each of the plurality of frames.

A candidate macro block is determined by calculating a motion classifier weight factor for each of the one or more macro blocks of a current frame. The motion classifier weight factor is the weighted average of a block movement factor for each of the one or more macro blocks of a previous frame and a temporal redundancy factor for each of the one or more macro blocks of the previous frame. Then, a link bandwidth weight factor is calculated upon receiving an Instantaneous Decoder Refresh frame. Thereafter, a probability factor is calculated, wherein the probability factor is the probability of selecting search pattern for the current frame same as the search pattern of the previous frame. A search method coefficient is then determined for the current frame, wherein the search method coefficient is a function of the motion classifier weight factor, the link bandwidth weight factor, and the probability factor. A block matching method is then dynamically selected for searching a candidate macro block based on the search method coefficient. The block matching method is selected based on one or more conditions. The conditions may be such that if the motion classifier weight factor indicates very high motion and the transform of the link bandwidth weight factor is less than a video generation rate then a Non uniform hierarchical search is performed, the Non uniform hierarchical search includes a combination of integer pixel search and half pixel or quarter pixel search with different types of search patterns. In case the transform of the link bandwidth weight factor is greater than the video generation rate and the probability factor is greater than a threshold then the search pattern of the previous frame is selected for the present frame, else a Variable hexagon based search is performed. If the motion classifier weight factor indicates high motion and the transform of the link bandwidth weight factor is less than the video generation rate then the Variable hexagon based search is performed. In case the transform of the link bandwidth weight factor is greater than the video generation rate and the probability factor is greater than a threshold then the search pattern of the previous frame is selected for the present frame, else a Fixed 3-step small hexagon based search is performed. The Fixed 3-step small hexagon based search is completed in 3 steps by searching at the points of hexagon centered with the corresponding current macro block in the previous frame. If the motion classifier weight factor indicates medium motion and the transform of the link bandwidth weight factor is less than the video generation rate then the Fixed 3-step small hexagon based search is performed. In case the transform of the link bandwidth weight factor is greater than the video generation rate and the probability factor is greater than a threshold then the search pattern of the previous frame is selected for the present frame, else a Variable diamond based search is performed. If the motion classifier weight factor indicates low motion and the transform of the link bandwidth weight factor is less than the video generation rate then the Variable diamond based search is performed. In case the transform of the link bandwidth weight factor is greater than the video generation rate and the probability factor is greater than a threshold then the search pattern of the previous frame is selected for the present frame, else a Fixed 3-step small diamond based search is performed. The Fixed 3-step small diamond based search is completed in 3 steps by searching at the points of diamond centered with the corresponding current macro block in the previous frame.

It is an object of the present disclosure to perform the efficient motion estimation in video coding with low computational complexity without compromising the quality and irrespective of the abnormal variance in motion present in the video content. The described method eliminates manual selection of the search algorithm by selecting a dynamic search pattern automatically during compression.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
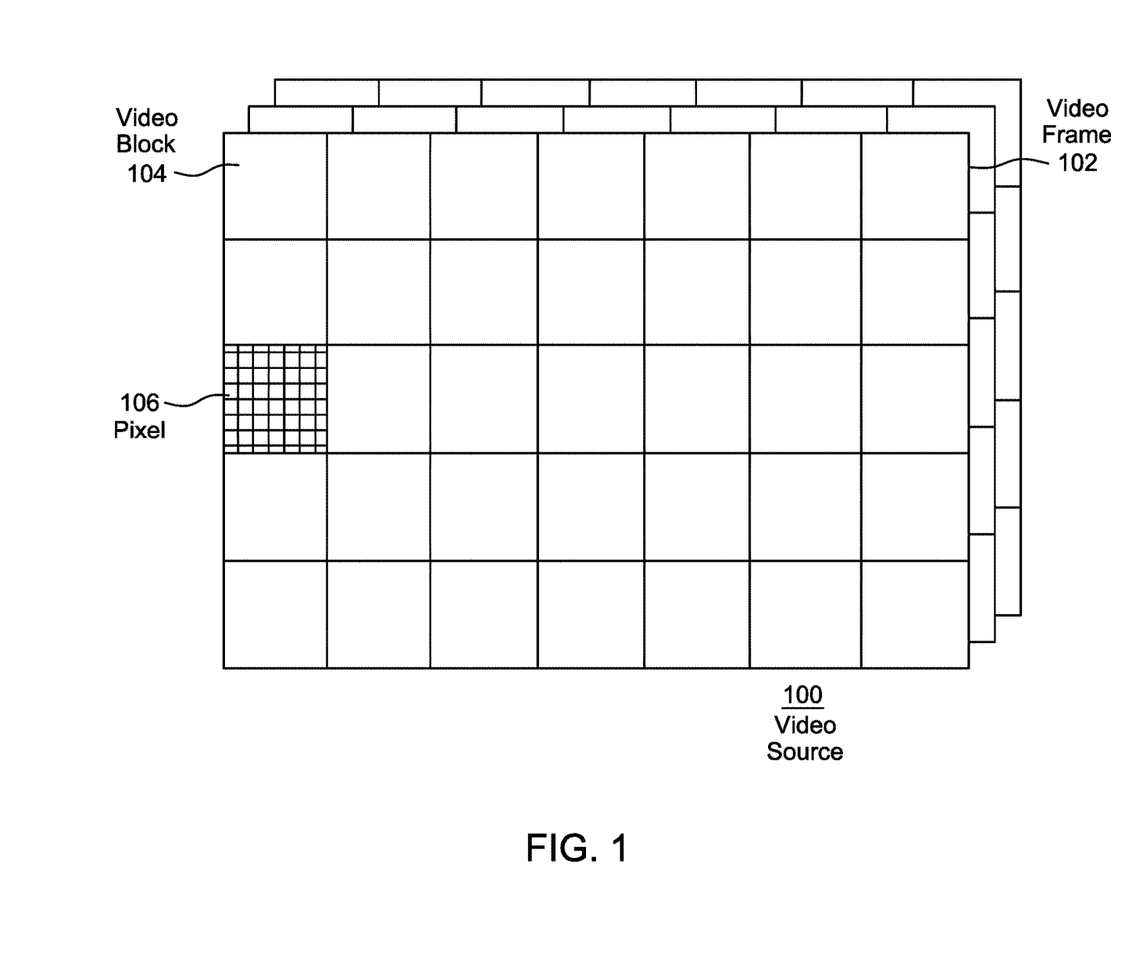
FIG. 1 illustrates an exemplary video source.

FIG. 1 illustrates an exemplary video source 100. The video source 100 consists of a series of video frames 102. Each video frame 102 is composed of a two-dimensional array of pixels 106. Common sizes for the video frame 102 include 352 pixels horizontally by 240 pixels vertically, referred to as Standard Image Format (SIF), 352 pixels horizontally by 288 pixels vertically, referred to as Common Interchange Format (CIF), and 176 pixels horizontally by 144 pixels vertically, referred to as Quarter CIF (QCIF). The video frames are commonly separated in time by 1/24, 1/25, or 1/29.97 seconds. Each video frame 102 may be divided into a plurality of macroblocks 104 having a grid of pixels. In the H.261, MPEG-1, and MPEG-2 standards a macroblock 104 consists of a 16 by 16 array of pixels. A video may be compressed by means of Intraframe coding or by Interframe coding. Intraframe coding exploits the redundancy within each frame of the video stream, also known as spatial redundancy. Intraframe compression techniques can be applied to individual frames of a video sequence. Specifically an intra coded video has a plurality of compressed frames that are encoded based on the information contained within an individual frame and the compression is not relative to any other frame in the video sequence. In other words, no temporal processing is performed outside of the current frame.

Figure 2:
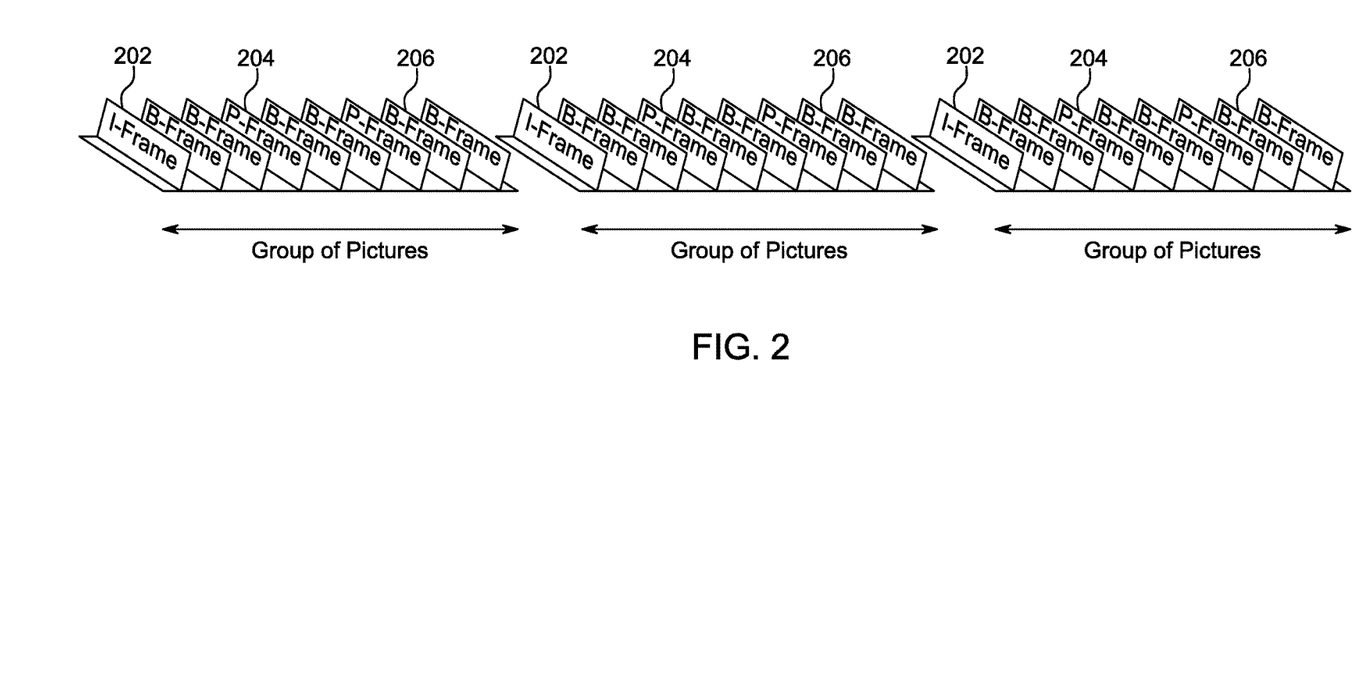
FIG. 2 illustrates a video having inter-coded frames with various types of frames.

FIG. 2 illustrates a video having inter-coded frames having various types of frames. Inter frame coding utilizes temporal redundancy between neighboring frames thereby achieving a higher compression rate. The inter-coded video illustrated in FIG. 2 describes three types of frames, namely, an I-frame (202), a P-frame (204), and a B-frame (206). An inter-coded video sequence begins with an I-frame and contains one or more P-frames and B-frames in between two I-frames. I-frame is also referred to as a key frame and such a frame contains all the information required to decode itself. I-frame does not require information from any other frame of the video sequence. P-frame stands for forward predicted pictures. The prediction is made from an earlier picture, mainly an I-frame, therefore a P-frame requires lesser coding data in comparison to an I-frame. The data needed for such a prediction consist of motion vectors and transform coefficients describing prediction correction. B-frame stands for bi-directionally predicted pictures. This kind of prediction method occupies less coding data than P-frames as they can be predicted or interpolated from an earlier and/or later frame such as an I-frame or a P-frame.

Similar to P-frames, B-frames are expressed as motion vectors and transform coefficients. An inter-coded video sequence comprises of a sequence starting with an I-frame with one or more P-frames and B-frames following the I-frame (202). Such a sequence structure is known as a group of pictures also referred to as a GOP. A video containing inter-coded frames comprises of one or more group of pictures which is a collection of successive frames starting with an I-frame.

Figure 3:
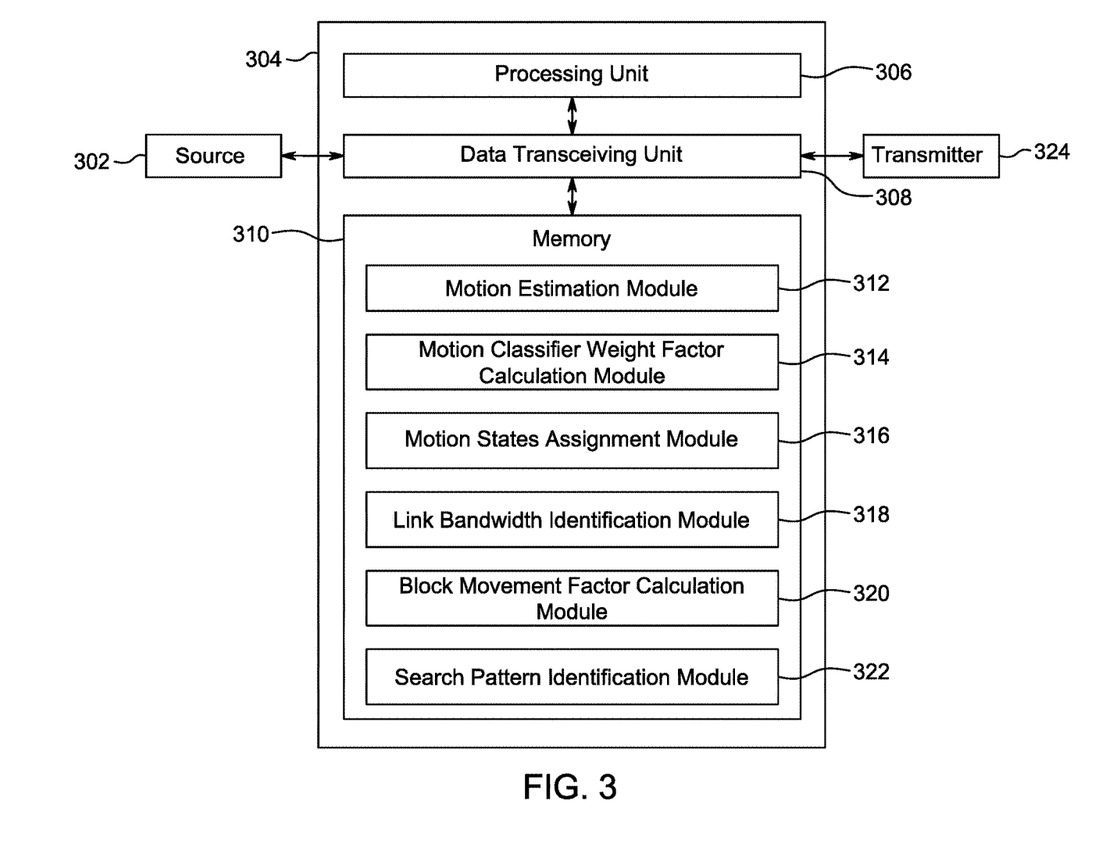
FIG. 3 is a block diagram of an image data compression system, according to an embodiment.

FIG. 3 is a block diagram of an image data compression system 304, according to an embodiment. The image data compression system 304 may receive the video to be compressed from a source 302. The source 302 may be a computing device, a database, a cloud based server, a camera, and the like. The image data compression system 304 upon compressing the video may send the compressed video to a transmitter 324. The transmitter 324 may be a wired transmitter or a wireless transmitter. In an aspect, the transmitter 324 may be a memory unit for storing the compressed video. The image data compression system 304 is a computing device having at least a processing unit 306, a data transceiver 308, and a memory 310. The processing unit 306 is configured for decoding and executing one or more instructions stored in the memory 310. Processing unit 306 may include one or more general purpose processors (e.g., INTEL microprocessors) and/or one or more special purpose processors (e.g., digital signal processors). Processing unit 306 is configured to execute computer-readable program instructions, such as program instructions to carry out any of the functions described in this description.

Memory 310 stores one or more instructions that may be decoded and executed by the processing unit 306. Memory 310 may include a non-transient computer readable medium. A computer readable medium may include volatile and/or non-volatile storage components, such as optical, magnetic, organic or other memory or disc storage, which may be integrated in whole or in part with a processor, such as processing unit 306. Alternatively, the entire computer readable medium may be remote from processing unit 306 and coupled to processing unit 306 by connection mechanism and/or network cable. Memory 310 is enabled to store various types of data. For instance, memory 310 may store one or more programming modules and data received by the data transceiver 308 and computer-readable program instructions executable by processing unit 306. In an example embodiment, the memory 310 comprises of a Motion Estimation Module 312, a Motion Classifier Weight Factor Calculation Module 314, a Motion states assignment Module 316, a Link Bandwidth Identification Module 318, a Search method selection Module 320, and a Search Pattern Identification Module 322. Each module may be executed by the processing unit 306 individually or one or more modules may be executed in parallel. Moreover, the video frames may be processed individually or one or more frames may be processed in parallel.

The image data compression system 304 is configured for determining a motion vector for the video frames. The movement of pixels present in a sequence of frames is observed to be related to the variance in the motion present in the video, which plays a precious role in finding the motion vector for a candidate macro block in motion estimation. The image data compression system 304 observes the motion from the previous frames of the video, which is used to predict search pattern and classify the motion for the current frame. When the motion is very less, the image data compression system 304 chooses a low complex search pattern and performs the motion estimation with less number of search points and vice-versa. Additionally, in case of video streaming in wireless mobile ad hoc networks, the system retrieves the available link bandwidth (link_bw) from the network and chooses the search pattern accordingly. The motion in the video is predicted by calculating a Temporal Redundancy Achieved (TRA) for previous frames and a Block Movement Factor (BMF) in the previous frame as described in FIG. 5.

Figure 4:
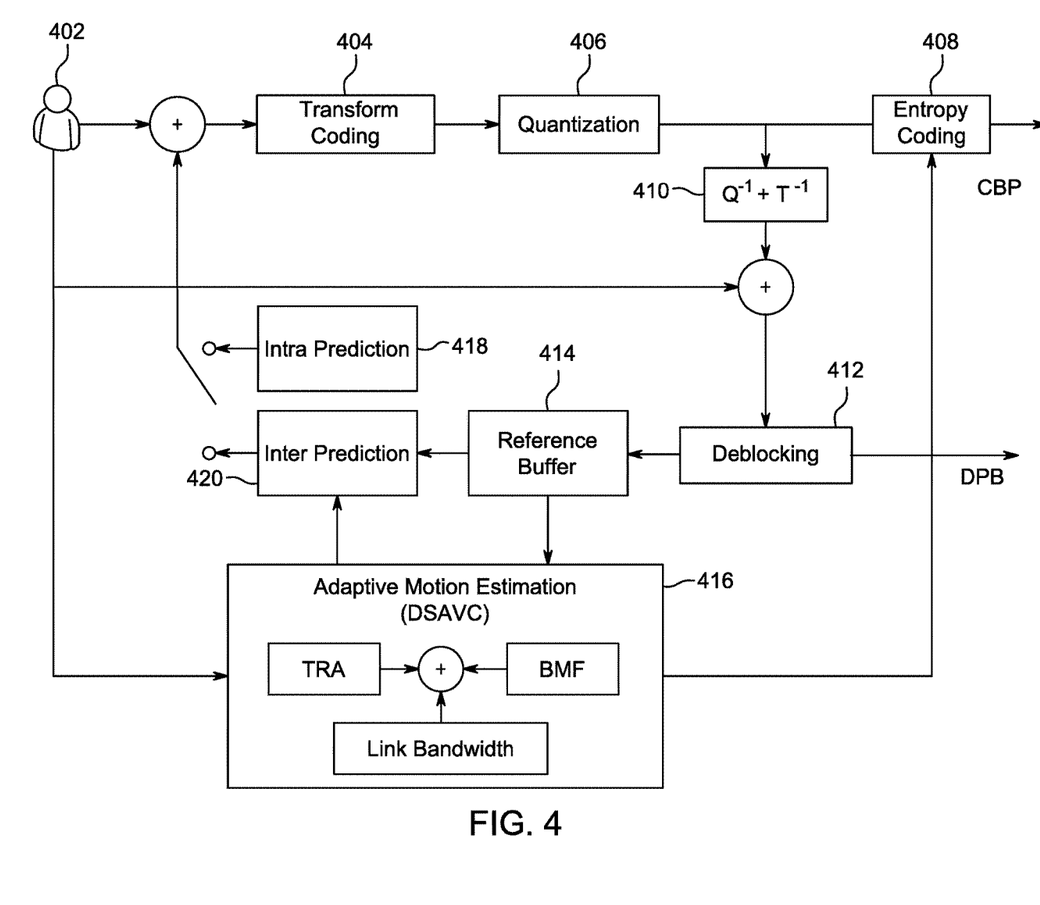
FIG. 4 is a functional diagram of the image data compression system, according to an embodiment.

FIG. 4 is a functional diagram of the image data compression system, according to an embodiment. The video 402 comprises of a plurality of frames and may be retrieved from a source. Each frame of the video 402 is divided into a plurality of macroblocks of a predefined size. In an aspect, each frame of the video may be divided into a size of 16×16 pixels. Each macroblock may then be processed individually or alternatively, one or more macroblocks may be processed in parallel. Each macroblock for a current frame is either predicted from the current frame (Intra prediction 418) or previous frames (Inter prediction 420) by estimating the motion present in the video. The predicted macro block is then subtracted from the current block to get a residual sample and a motion vector. The residual sample is then transformed by means of transform coding 404 from pixel domain to integer domain. Each block of residual sample is transformed either by using a 4×4 or 8×8 block integer transform which is an approximate form of Discrete Cosine Transform (DCT). The output of the transform coding 404 is a set of coefficients each of which is weighted value for standard pattern. These coefficients are then quantized 406 i.e. the coefficients are divided by a predefined integer value. This reduces the precision of the coefficients according to a quantization parameter (QP). After all the macroblocks have been quantized, the macroblocks are reordered and entropy encoded 408. Entropy encoding 408 converts the video data into chunks of bit stream and may send it to a network abstraction layer (NAL) for transmission or storage. The quantized transform coefficients are then processed by means of invert quantization 410 and then the de-quantized data is processed by an inverse transform 410 to produce difference data. A deblocking filter 412 is responsible for a function of reducing the distortion of a block which occurs when an image is encoded. A reference block is then stored in a reference buffer 414. The reference block stored in the reference buffer 414 is then used for Adaptive motion estimation 416. The Adaptive motion estimation 416 takes the Temporal Redundancy Achieved (TRA) for previous frames and the Block Movement Factor (BMF) in the previous frame for determining a matching macroblock. The Adaptive motion estimation 416 also takes into consideration the link bandwidth available. The Adaptive motion estimation 416 is described in detail in FIG. 5.

Figure 5:
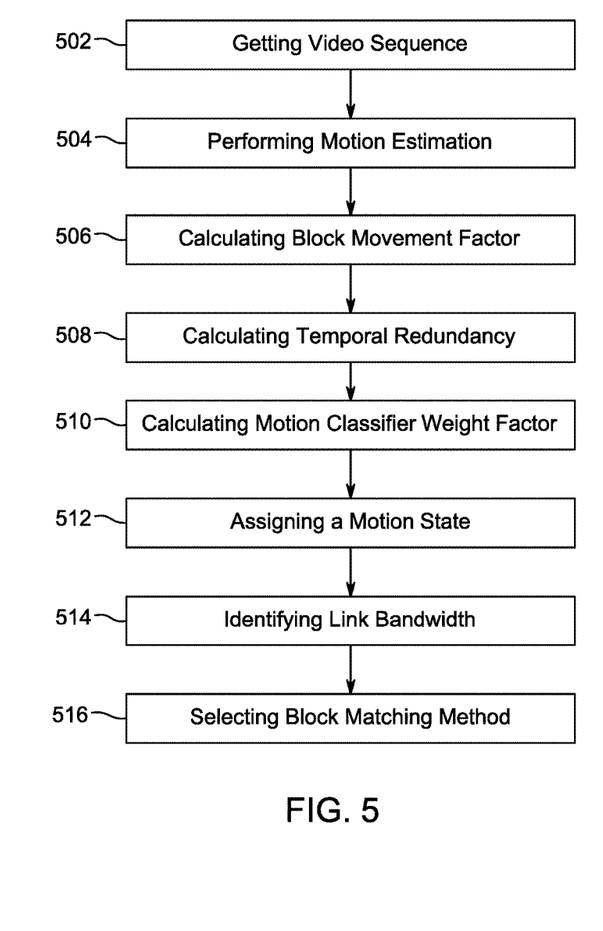
FIG. 5 is a flowchart describing the various steps taken for dynamically selecting a block matching search method, according to an embodiment.

FIG. 5 is a flowchart describing the various steps taken for dynamically selecting a block matching search method, according to an embodiment. Initially at step 502, a Video Sequence is retrieved from a source. The source may be a storage means such as a memory unit or database. A tiered scene labelling is applied to each frame and each frame is divided into multiple slices or control units having a predefined size. In an aspect, the frames may be divided into blocks of 16×16 pixels or 64×64 pixels. For each slice, a suitable search pattern is selected according to the motion present in the video. In case of interframe coding, the labelling is applied only for P and B frames, whereas I frames are not labeled as there are no reference frames.

At step 504, Motion Estimation is performed for determining a motion vector. Once, the frame is labeled, inter space distance (I) of the macro blocks in the current slice of the frame to the candidate macro blocks of the reference frame are calculated, using the motion vector of the previous frame.

$$I = \sqrt{(MVx[i] - MVx[i-1])2 + (MVy[i] - MVy[i-1])2} \quad (1)$$

Equation (1) shows the computation of the inter space distance (I), where $MV_x[i-1]$ and $MV_y[i-1]$ is the position of candidate macro block for the current macro block $MV_x[i]$ and $MV_y[i]$.

At step 506, a Block Movement Factor (BMF) is calculated upon which the motion present in the video is classified.

$$BMF = \frac{1}{Nf, mb} * \Sigma_{k=0}^{Nf,mb} \sqrt{(MVx[i] - MVx[i-1])2 + (MVy[i] - MVy[i-1])2} \quad (2)$$

The Block Movement Factor (BMF) for each slice S in frame F is calculated as shown in Equation (2), where $N_{f,mb}$ is the Number of macro blocks in a frame. After calculating BMF from the motion vectors, motion present in the video is classified. Based on the identified motion one of the search pattern is determined. After selecting the search pattern, a probability analysis is made to get the probability of selecting the same pattern in the next frame for the current slice. This probability of choosing same pattern is multiplied for each frame until an Instantaneous Decoder Refresh (IDR) frame is reached to get the accurate prediction of selecting same pattern. An IDR frame is a special type of I-frame in H.264. An IDR frame specifies that no frame after the IDR frame can reference any frame before it. This makes seeking the H.264 file easier and more responsive in the player.

Therefore, the probability of choosing same pattern of slice S, in frame F is given in Equation (3), considering the previous information of frames L|L<$N_{idr}$, where $N_{idr}$ is the periodicity of IDR frames. The probability contribution of choosing the same pattern from the previous frame, for the current frame F, is shown in Equation (4), where, $H_{sp}$ (F, S)$^{(K, i)}$ is the probability of selecting the same pattern for $i^{th}$ block of the slice S in the previous frame K. Finally, the accumulated probability from all the earlier frames up until previous frame L|L<$N_{idr}$ is given in Equation (5), where $H'_{sp}$(F, S) is the probability of choosing the same pattern in next frame and $H''_{sp}$(F, S) is the probability calculated for each IDR frame based on the empirical analysis.

$$H'_{sp}(F,S) = \Pi_{K=1}^{L} P(\text{choosing same pattern in } L+1) \quad (3)$$

Where, k≤L≤$N_{idr}$

P (choosing same pattern in frame $$L+1 \mid L \in Rf) = \frac{1}{Nf, mb}\left(\sum_{i=1}^{Nf,mb} Hsp(F, S)(K, i)\right) \quad (4)$$

Therefore, $$H'_{sp}(F, S) = \begin{cases} H''_{sp}(F, S) & (\text{if is } NextFrameIDR) \\ \left(\frac{1}{Nf,mb}\right)^{L:K \leq L \leq Nidr} \prod_{K=1} \left(\sum_{i=1}^{Nf,mb} Hsp(F, S)(K, l)\right) \end{cases} \quad (5)$$

At step 508, Temporal Redundancy is computed. The temporal redundancy is computed according to the Equation (6). The TRA is calculated for Rf, which is the maximum number of reference frames for inter frame prediction.

$$g(TRA)=(tra_1+tra_2+ \ldots +tra_{Rf})/Rf \qquad (6)$$

Where, tra1=$\lambda$1*fmb+$\lambda$2*pmb and $\lambda$1, $\lambda$2 are two constants selected based on the analysis of number of partially and fully matched blocks; fmb is the number of fully matched blocks for the previous frame, and pmb is the number of partially matched blocks for the previous frame. The fmb and pmb are updated for the frame after completion of each macro block encoding.

Motion Classifier Weight Factor is calculated at step 510. After classifying motion into one of the five states using Equation (7), the algorithm finds the appropriate search pattern dynamically for that particular state of the motion. Here, $\Theta$ performs the weighted average of f(BMF) and g(TRA). Tmcwf is the motion classifier weight factor and f(BMF) gives transformed coefficient for Block Movement Factor (BMF).

$$Tmcwf=f(BMF)\Theta g(TRA) \qquad (7)$$

At step 512, a Motion State is assigned for the macroblock being processed. The calculated Motion Classifier Weight Factor is compared with a threshold and assigned one of the five states (very low, low, normal, high, and very high). The threshold for comparing the Motion Classifier Weight Factor is selected based on the empirical analysis carried out with various motion test cases.

At step 514, a Link Bandwidth is identified. The link bandwidth notification is taken from the lower layers for every interval of Instantaneous Decoder Refresh (IDR) frame, so that the quality degradation can be minimized by sending I frame and then performing the classification of search pattern based on link bandwidth. The application of newly calculated search pattern can be applied at the frame level or macro block level. This is again based on the classification of the video streaming latency requirements such as low latency or ultra low latency flows. Since the complexity is high if a search pattern is selected for each macro blocks, for video streaming applications with ultra low latency, choosing the search pattern at frame level gives optimal performance. Whereas, for some of the low latency video streaming applications, the selection of search patterns can be applied at each block level, which gives the efficient number of search points. In an aspect, link bandwidth is determined after every 250 frames. The link bandwidth weight factor is calculated using h(link_bw), where link_bw is taken from the network and the function h(link_bw) gives a transform coefficient of the link bandwidth. Once the motion classifier weight factor is calculated, the available link bandwidth is analyzed and a suitable search pattern for block matching is assigned.

At step 516, a Block matching method is assigned.

$$Tsp=\Psi(f(BMF)\Theta g(TRA),h(link\_bw)) \qquad (8)$$

The search point factor Tsp is a function of the Block Movement Factor (BMF), the temporal redundancy, and the available bandwidth. Initially only the Block Movement Factor (BMF) and the temporal redundancy are considered for determining the level of motion present in the macroblock. Upon determining the level of motion, the link bandwidth is considered for determining a search method that is assigned for determining the best matching block. In case the motion classifier weight factor indicates very high motion and the transform of the link bandwidth weight factor is less than a video generation rate then a Non uniform hierarchical search is performed, the Non uniform hierarchical search includes a combination of integer pixel search and half pixel or quarter pixel search with different types of search patterns, in case the transform of the link bandwidth weight factor is greater than the video generation rate and the probability factor is greater than a threshold then the search pattern of the previous frame is selected for the present frame, else a Variable hexagon based search is performed; if the motion classifier weight factor indicates high motion and the transform of the link bandwidth weight factor is less than the video generation rate then the Variable hexagon based search is performed, in case the transform of the link bandwidth weight factor is greater than the video generation rate and the probability factor is greater than a threshold then the search pattern of the previous frame is selected for the present frame, else a Fixed 3-step small hexagon based search is performed, the Fixed 3-step small hexagon based search is completed in 3 steps by searching at the points of hexagon centered with the corresponding current macro block in the previous frame; if the motion classifier weight factor indicates medium motion and the transform of the link bandwidth weight factor is less than the video generation rate then the Fixed 3-step small hexagon based search is performed, in case the transform of the link bandwidth weight factor is greater than the video generation rate and the probability factor is greater than a threshold then the search pattern of the previous frame is selected for the present frame, else a Variable diamond based search is performed; if the motion classifier weight factor indicates low motion and the transform of the link bandwidth weight factor is less than the video generation rate then the Variable diamond based search is performed, in case the transform of the link bandwidth weight factor is greater than the video generation rate and the probability factor is greater than a threshold then the search pattern of the previous frame is selected for the present frame, else a Fixed 3-step small diamond based search is performed, the Fixed 3-step small diamond based search is completed in 3 steps by searching at the points of diamond centered with the corresponding current macro block in the previous frame.

The Fixed 3-step small diamond search (F3SDS) is performed for very low motion frames which converge in a maximum of 13 search points in 3 steps exponentially reducing the number of comparisons. Initially in first step, a center macro block at the same position in the previous frame and at 4 points around that point is search for best matching macro block. Once finding the best block, in second step, the half pixel search is performed at 4 points around the selected previous best block. The process will end in third step with searching the quarter pixel search again at 4 points around the best block selected in second step.

The Variable diamond search is performed for low motion frames of video, which converges with a low MVSR derived from DMVSR. This is the typical diamond search pattern which converges only when it gets best macro block at the center or crosses motion vector search range. where the search is performed at the positions of a diamond centered with the corresponding current macro block in the previous frame.

The Fixed 3-step small hexagon search (F3SHS) is performed for frames which have moderate motion which converges in a maximum of 17 search points in 3 steps. Similar to Fixed 3-step small diamond search, it runs in 3 steps for finding the best macro block by performing the hexagonal search pattern with extra 4 search points.

The Variable hexagon based search (VHS) runs in hexagon pattern and is performed for high motion frames which converges with appropriate MVSR derived from DMVSR. It is a typical hexagonal search which converges only when it gets best macro block at the center or crosses motion vector search range, where the search is performed at the positions of a hexagon centered with the corresponding current macro block in the previous frame.

The Non uniform hierarchical search (NUHS) is an uneven hybrid search pattern, which is applied when there is very high motion present in the video. This search pattern performs the motion vector prediction for more number of candidate macro blocks which results in best matched macro block, hence the NUHS algorithm enhances the quality of the video in the case of high pixel movement and provides high compression ratio by slightly compromising the complexity. If the TRA calculated is more than very high motion threshold for a certain number of consecutive frames, then in order to bring down the computational complexity, VHS is triggered in place of NUHS, as the latter increases the computational complexity further. The TRA is calculated for each frame and is periodically checked for the motion in the video and gets back to Dynamic Search Algorithm in Video Coding (DSAVC) to assign different types of search patterns again if there is a discontinuity in the motion.

For every IDR interval, the error measuring techniques, namely, mean-absolute error (MAE), sum of absolute difference (SAD) and sum squared difference (SSD) are varied for block matching accuracy based on the motion classifier weight factor. Since the SSD gives accurate error measurement compared to MAE and SAD, it is selected for high motion video content. Two thresholds Π1 and Π2 are derived based on the empirical analysis for analyzing the motion classifier (Tmcwf) vector. If Tmcwf is less than Π1 then SSD is selected for distortion measure. If Tmcwf is between Π1 and Π2 then MAE is selected. Otherwise, SAD is selected for error measure. This way, it also helps in optimising the computational complexity as SSD is more complex than other two methods. In an aspect, the IDR interval is varied based on the motion classifier weight factor. In another aspect, the error measuring techniques are varied for every IDR interval based on the motion classifier weight factor.

The described method is highly efficient in the case of video transport applications such as sports streaming and gaming, where there is a high variance in the motion in the video, as the search pattern will be chosen according the motion present in the video. Since the multiple search patterns employed are independent and highly parallelizable, the best suitable search patterns may be executed independently on multi core or many core platforms such as GPU, DSP or FPGA for speed up in computation. The described method is highly efficient for changing the video resolution dynamically during streaming applications such as YouTube, Facebook and other online video broadcasting applications in the case of non deterministic bandwidth availability.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for motion estimation for coding a video sequence having a plurality of frames, comprising the steps of:

extracting one or more macro block from each of the plurality of frames;

determining for each of the one or more macro blocks a corresponding motion vector by dynamically performing motion estimation;

determining for each of the plurality of frames a candidate macro block by:

calculating a motion classifier weight factor for each of the one or more macro blocks of a current frame, the motion classifier weight factor is weighted average of a block movement factor for each of the one or more macro blocks of a previous frame corresponding to a current frame and a temporal redundancy factor for each of the one or more macro blocks of the previous frame;

calculating a link bandwidth weight factor upon receiving an Instantaneous Decoder Refresh frame;

calculating a probability factor, the probability factor being the probability of selecting search pattern for the current frame same as the search pattern of the previous frame;

determining a search method coefficient for the current frame, wherein the search method coefficient is a function of the motion classifier weight factor, the link bandwidth weight factor, and the probability factor; and dynamically selecting a block matching method for searching a candidate macro block based on the search method coefficient, wherein if the motion classifier weight factor indicates very high motion and the transform of the link bandwidth weight factor is less than a video generation rate then a Non uniform hierarchical search is performed, the Non uniform hierarchical search includes a combination of integer pixel search and half pixel or quarter pixel search with different types of search patterns, in case the transform of the link bandwidth weight factor is greater than the video generation rate and the probability factor is greater than a threshold then the search pattern of the previous frame is selected for the present frame, else a Variable hexagon based search is performed;

if the motion classifier weight factor indicates high motion and the transform of the link bandwidth weight factor is less than the video generation rate then the Variable hexagon based search is performed, in case the transform of the link bandwidth weight factor is greater than the video generation rate and the probability factor is greater than a threshold then the search pattern of the previous frame is selected for the present frame, else a Fixed 3-step small hexagon based search is performed, the Fixed 3-step small hexagon based search is completed in 3 steps by searching at the points of hexagon centered with the corresponding current macro block in the previous frame;

if the motion classifier weight factor indicates medium motion and the transform of the link bandwidth weight factor is less than the video generation rate then the Fixed 3-step small hexagon based search is performed, in case the transform of the link bandwidth weight factor is greater than the video generation rate and the probability factor is greater than a threshold then the search pattern of the previous frame is selected for the present frame, else a Variable diamond based search is performed; and if the motion classifier weight factor indicates low motion and the transform of the link bandwidth weight factor is less than the video generation rate then the Variable diamond based search is performed, in case the transform of the link bandwidth weight factor is greater than the video generation rate and the probability factor is greater than a threshold then the search pattern of the previous frame is selected for the present frame, else a Fixed 3-step small diamond based search is performed, the Fixed 3-step small diamond based search is completed in 3 steps by searching at the points of diamond centered with the corresponding current macro block in the previous frame; and encoding the video sequence based on the candidate macro block.

2. The method as claimed in claim 1, wherein the step of extracting one or more macroblocks comprises of:
applying labelling on each of the plurality of frames for dividing the frames into a plurality of slices;
dividing each of the plurality of slices into a plurality of control units; and
dividing each of the plurality of control units into a plurality of macro blocks.

3. The method as claimed in claim 2, wherein the video sequence is an inter-coded video sequence.

4. The method as claimed in claim 3, wherein the labelling is applied on P-frames and B-frames of the inter-coded video sequence.

5. The method of claim 1, wherein the block movement factor is equal to $$\frac{1}{Nf,mb} * \Sigma_{k=0}^{Nfmb} \sqrt{(MVx[i]-MVx[i-1])2+(MVy[i]-MVy[i-1])2},$$

where $MV_x^{[i-1]}$ and $MV_y^{[i-1]}$ is the position of a candidate macro block for a current macro block $MV_x^{[i]}$ and $MV_y^{[i]}$, wherein $\sqrt{(MVx[i]-MVx[i-1])2+(MVy[i]-MVy[i-1])2}=I$, where I is an inter space distance of the macro blocks in the current slice of the current frame to the candidate macro blocks in corresponding slice of the previous frame.

6. The method of claim 1, wherein the temporal redundancy factor is equal to $(tra_1+tra_2+ \ldots +tra_{Rf})/Rf$, where $tra1=\lambda 1*fmb+\lambda 2*pmb$ and $\lambda 1, \lambda 2$ are predefined constants based on an analysis of partially matched macro block (pmb) and fully matched macro block (fmb), and Rf denotes maximum number of reference frames.

7. The method of claim 1, wherein the motion classifier weight factor is equal to weighted average of the block movement factor and the temporal redundancy factor.

8. The method of claim 1, wherein an interval between two Instantaneous Decoder Refresh frames is varied based on the motion classifier weight factor.

9. The method of claim 1, wherein the search method coefficient is equal to $\Psi(f(BMF)\Theta g(TRA), h(link\_bw))$, where $h(link\_bw)$ is a transformed coefficient of available link bandwidth.

10. The method of claim 1, further comprising the steps of:
performing a probability analysis for calculating probability of selecting the same search pattern in a next frame for a current slice (S) in frame (F);
multiplying the probability for each frame until an instantaneous decoder refresh (IDR) frame for getting an accurate prediction of selecting the same pattern;
calculating the probability of selecting the same pattern in next frame (L+1) by
$H'_{sp}(F,S)=\Pi_{K=1}^{L}P$(choosing same pattern in L+1), where $k \leq L \leq N_{idr}$, $L \in N_{idr}$ and $N_{idr}$ is a periodicity of IDR frames;
calculating the probability contribution of selecting the same pattern from the previous frame (K), for the current frame (F) by
P(choosing same pattern in frame L+1|L $\in$ Rf)

$$= \frac{1}{Nf,mb}$$

$(\Sigma_{i=1}^{Nf,mb}Hsp(F,S)(K,l))$, where $H_{sp}(F, S)^{(K, i)}$ is a probability of selecting the same pattern for an $i^{th}$ block of the slice (S) in the previous frame (K);
calculating an accumulated probability from all the previous frames until previous frame L|L<$N_{idr}$ by $$H'_{sp}(F, S) = \begin{cases} H''_{sp}(F, S) & \text{(if is NextFrameIDR)} \\ \left(\frac{1}{Nf,mb}\right)^L \prod_{K=1}^{L:K \leq L \leq Nidr} \left(\sum_{i=1}^{Nf,mb} Hsp(F, S)(K, l)\right), \end{cases}$$

where $H''_{sp}(F, S)$ is a probability calculated for each IDR frame based on an empirical analysis.

11. The method of claim 1, wherein the selected block matching method uses an error measuring technique selected from the group consisting of Mean Absolute Error technique, sum of absolute differences technique, and Sum of Squared Distance technique.

12. The method of claim 11, wherein the error measuring technique is selected for every IDR interval based on the motion classifier weight factor.

13. A system for motion estimation for coding a video sequence having a plurality of frames, the system comprising:
- a memory for storing data, metadata and one or more programming modules; and
- a processor configured for executing the one or more programming modules stored in a memory that upon execution executed the steps of:
- extracting one or more macro block from each of the plurality of frames;
- determining for each of the one or more macro blocks a corresponding motion vector by dynamically performing motion estimation;
- determining for each of the plurality of frames a candidate macro block by:
- calculating a motion classifier weight factor for each of the one or more macro blocks of a current frame, the motion classifier weight factor is weighted average of a block movement factor for each of the one or more macro blocks of a previous frame corresponding to a current frame and a temporal redundancy factor for each of the one or more macro blocks of the previous frame;
- calculating a link bandwidth weight factor upon receiving an Instantaneous Decoder Refresh frame;
- calculating a probability factor, the probability factor being the probability of selecting search pattern for the current frame same as the search pattern of the previous frame;
- determining a search method coefficient for the current frame, wherein the search method coefficient is a function of the motion classifier weight factor, transform of the link bandwidth weight factor, and the probability factor; and
- dynamically selecting a block matching method for searching a candidate macro block based on the search method coefficient, wherein
  - if the motion classifier weight factor indicates very high motion and the transform of the link bandwidth weight factor is less than a video generation rate then a Non uniform hierarchical search is performed, the Non uniform hierarchical search includes a combination of integer pixel search and half pixel or quarter pixel search with different types of search patterns, in case the transform of the link bandwidth weight factor is greater than the video generation rate and the probability factor is greater than a threshold then the search pattern of the previous frame is selected for the present frame, else a Variable hexagon based search is performed;
  - if the motion classifier weight factor indicates high motion and the transform of the link bandwidth weight factor is less than the video generation rate then the Variable hexagon based search is performed, in case the transform of the link bandwidth weight factor is greater than the video generation rate and the probability factor is greater than a threshold then the search pattern of the previous frame is selected for the present frame, else a Fixed 3-step small hexagon based search is performed, the Fixed 3-step small hexagon based search is completed in 3 steps by searching at the points of hexagon centered with the corresponding current macro block in the previous frame;
  - if the motion classifier weight factor indicates medium motion and the transform of the link bandwidth weight factor is less than the video generation rate then the Fixed 3-step small hexagon based search is performed, in case the transform of the link bandwidth weight factor is greater than the video generation rate and the probability factor is greater than a threshold then the search pattern of the previous frame is selected for the present frame, else a Variable diamond based search is performed; and
  - if the motion classifier weight factor indicates low motion and the transform of the link bandwidth weight factor is less than the video generation rate then the Variable diamond based search is performed, in case the transform of the link bandwidth weight factor is greater than the video generation rate and the probability factor is greater than a threshold then the search pattern of the previous frame is selected for the present frame, else a Fixed 3-step small diamond based search is performed, the Fixed 3-step small diamond based search is completed in 3 steps by searching at the points of diamond centered with the corresponding current macro block in the previous frame; and
- encoding the video sequence based on the candidate macro block.

14. A non-transient computer-readable medium, including instructions stored thereon which, when read and executed by one or more computers, causes the one or more computers to perform the method comprising the steps of:
- extracting one or more macro block from each of the plurality of frames;
- determining for each of the one or more macro blocks a corresponding motion vector by dynamically performing motion estimation;
- determining for each of the plurality of frames a candidate macro block by:
- calculating a motion classifier weight factor for each of the one or more macro blocks of a current frame, the motion classifier weight factor is weighted average of a block movement factor for each of the one or more macro blocks of a previous frame corresponding to a current frame and a temporal redundancy factor for each of the one or more macro blocks of the previous frame;
- calculating a link bandwidth weight factor upon receiving an Instantaneous Decoder Refresh frame;
- calculating a probability factor, the probability factor being the probability of selecting search pattern for the current frame same as the search pattern of the previous frame;
- determining a search method coefficient for the current frame, wherein the search method coefficient is a function of the motion classifier weight factor, transform of the link bandwidth weight factor, and the probability factor; and
- dynamically selecting a block matching method for searching a candidate macro block based on the search method coefficient, wherein
  - if the motion classifier weight factor indicates very high motion and the transform of the link bandwidth weight factor is less than a video generation rate then a Non uniform hierarchical search is performed, the Non uniform hierarchical search includes a combination of integer pixel search and half pixel or quarter pixel search with different types of search patterns, in case the transform of the link bandwidth weight factor is greater than the video generation rate and the probability factor is greater than a threshold then the search pattern of the previous frame is selected for the present frame, else a Variable hexagon based search is performed;

if the motion classifier weight factor indicates high motion and the transform of the link bandwidth weight factor is less than the video generation rate then the Variable hexagon based search is performed, in case the transform of the link bandwidth weight factor is greater than the video generation rate and the probability factor is greater than a threshold then the search pattern of the previous frame is selected for the present frame, else a Fixed 3-step small hexagon based search is performed, the Fixed 3-step small hexagon based search is completed in 3 steps by searching at the points of hexagon centered with the corresponding current macro block in the previous frame;

if the motion classifier weight factor indicates medium motion and the transform of the link bandwidth weight factor is less than the video generation rate then the Fixed 3-step small hexagon based search is performed, in case the transform of the link bandwidth weight factor is greater than the video generation rate and the probability factor is greater than a threshold then the search pattern of the previous frame is selected for the present frame, else a Variable diamond based search is performed; and if the motion classifier weight factor indicates low motion and the transform of the link bandwidth weight factor is less than the video generation rate then the Variable diamond based search is performed, in case the transform of the link bandwidth weight factor is greater than the video generation rate and the probability factor is greater than a threshold then the search pattern of the previous frame is selected for the present frame, else a Fixed 3-step small diamond based search is performed, the Fixed 3-step small diamond based search is completed in 3 steps by searching at the points of diamond centered with the corresponding current macro block in the previous frame;

encoding the video sequence based on the candidate macro block.

* * * * *